(12) United States Patent
Furui et al.

(10) Patent No.: US 7,140,395 B2
(45) Date of Patent: Nov. 28, 2006

(54) BRAKE HOSE

(75) Inventors: Kenichiro Furui, Aichi-ken (JP);
Satoshi Mizutani, Aichi-ken (JP);
Shigeki Okuhara, Aichi-ken (JP);
Noriyuki Kondo, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 11/384,833

(22) Filed: Mar. 21, 2006

(65) Prior Publication Data

US 2006/0213568 A1    Sep. 28, 2006

(30) Foreign Application Priority Data

Mar. 25, 2005    (JP)    ............... 2005-088347

(51) Int. Cl.
*F16L 11/10*    (2006.01)
(52) U.S. Cl. .................... 138/126; 138/137; 428/36.91
(58) Field of Classification Search ................ 138/126, 138/130, 137; 428/36.91
See application file for complete search history.

(56) References Cited

U.S. PATENT DOCUMENTS

| | | | |
|---|---|---|---|
| 3,750,712 A | * | 8/1973 | Brand .................. 138/124 |
| 6,450,206 B1 | * | 9/2002 | Ishikawa et al. ........... 138/126 |
| 6,626,211 B1 | * | 9/2003 | Mizutani et al. .......... 138/126 |
| 6,631,742 B1 | * | 10/2003 | Hagiwara et al. .......... 138/126 |
| 6,648,023 B1 | * | 11/2003 | Nakakita et al. .......... 138/127 |
| 6,736,167 B1 | * | 5/2004 | Mizutani et al. .......... 138/126 |
| 7,017,616 B1 | * | 3/2006 | Ono et al. ................. 138/126 |

FOREIGN PATENT DOCUMENTS

| | | | |
|---|---|---|---|
| EP | 1314925 A1 | * | 5/2003 |
| JP | A-63-303288 | | 12/1988 |
| JP | A-06-305083 | | 11/1994 |

* cited by examiner

*Primary Examiner*—James Hook
(74) *Attorney, Agent, or Firm*—Posz Law Group, PLC (57) ABSTRACT

A brake hose is made by laminating an inner tube rubber layer, lower yarn layer, intermediate rubber layer, upper yarn layer, and cover rubber layer. The rubber material of the inner tube rubber layer and intermediate rubber layer is a blend material in which 40 to 80 wt % is IIR and the remainder is EPDM. The upper yarn is PVA, and the upper yarn is PET, where the tensile strength per unit decitex is at least 6.5 g, and the 2.7 g elongation is 2.6±1%. The brake hose has better water penetration resistance and can be produced by a general purpose method.

8 Claims, 6 Drawing Sheets

BRAKE HOSE

This application claims the benefit of and priority from Japanese Application No. 2005-88347 filed Mar. 25, 2005, the content of which is incorporated herein by reference.

BACKGROUND OF THE INVENTION

1. Field of the Invention

The invention relates to a brake hose formed by the lamination of a plurality of rubber layers and reinforcing layer, which is used in automobiles and the like.

2. Description of the Related Art

Figure 11:
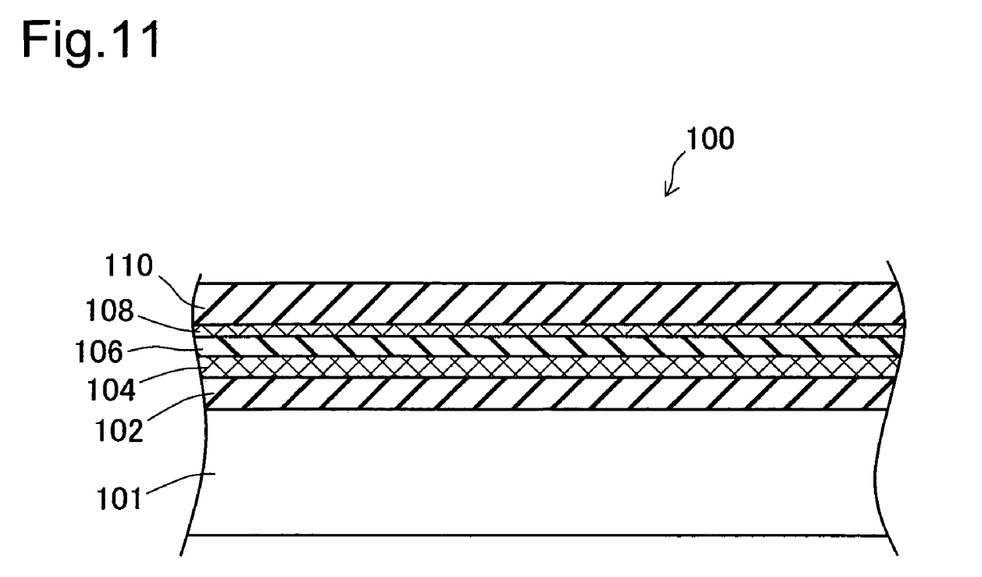
FIG. 11 is a cross section of main parts of conventional brake hose.

A conventional brake hose used in automobiles is described in JP-A-63-303,288 or JP-A-6-305,083 (see FIG. 11). FIG. 11 is a cross section of the main components of a conventional brake hose 100. The brake hose 100 is formed by laminating several layers of rubber and yarn layers because of the need for high pressure resistance against brake hydraulics. That is, the brake hose 100 is formed by laminating an inner tube rubber layer 102 forming a flow path 101 for flowing brake oil, a lower yarn layer 104, an intermediate layer 106, an upper yarn layer 108, and an outer tube rubber layer 110.

The brake hoses 100 are used for long periods of time in an environment involving elevated temperatures and high humidity. In such environments, moisture from the atmosphere can sometimes penetrate through the outer tube rubber layer 110 into the interior layers and become dissolved in the brake fluid, causing vapor locks and compromising the pedal feel. Known techniques to overcome this drawback include the use of IIR with better water penetration resistance in the intermediate rubber layer (JP-A-63-303) and the use of EPDM/IIR two-layer rubber for the inner tube rubber layer (JP-A-6-305,083). Both of these conventional techniques result in better, although still not satisfactory, resistance to water penetration, and not only odes the latter technique require double-layer extruders, but the control of the thickness of the inner tube rubber layer is complicated.

SUMMARY

An advantage of some aspects of the invention is to provide a brake hose which has better resistance to water penetration and which can be produced by a general purpose method.

According to an aspect of the invention is provided with a brake hose including reinforcing layers in a rubber base. The brake hose comprises an inner tube rubber layer that is made of a first rubber material and has a flow path for flowing fluid; a lower yarn layer formed by braiding first yarns made of a first yarn material around the inner tube rubber layer; an intermediate rubber layer that is made of a second rubber material and covers the lower yarn layer; an upper yarn layer formed by braiding second yarns made of a second yarn material around the intermediate rubber layer and; a cover rubber layer that is made of a third rubber material and covers the upper yarn layer. Each of the first and second rubber material is a blend in which 40 to 80 wt % is an isobutylene-isoprene copolymer (IIR) and, 20 to 60% is an ethylene-propylene-diene copolymer (EPDM). The first yarn material is polyethylene terephthalate (PET), with a tensile strength per unit decitex of at least 6.5 g, and 2.7 g elongation of 2.6±1%. The second yarn material is polyvinyl alcohol (PVA).

In the brake hose of the invention, the rubber material of the inner tube rubber layer and intermediate rubber layer involves the use of a blend in which 40 to 80 wt % is IIR and the rest is EPDM, so as to prevent the penetration of moisture. The upper yarn involves the use of polyvinyl alcohol (PVA) so that the penetration of water into the interior layers can be controlled because of the high water retention of the material. Furthermore, the lower yarn layer is PET, allowing high durability and low volume expansion to be combined. The brake hose can thus reduce the amount of water penetrating from the outside into the interior, while preserving durability and low volume expansion, and can better prevent the phenomenon of vapor locks.

In addition, the inner tube rubber layer and intermediate rubber layer can e made of single layers by the extrusion of blended materials, and are thus easier to produce than in conventional techniques.

In a preferred embodiment of the invention, the upper yarn layer is formed by intertwining two groups of upper yarn formed from single yarn bundles, the two groups of upper yarn being interwoven at a braiding angle of 57 to 61 degrees. This can increase the amount of fiber per unit length of the upper yarn layer, resulting in better water retention and less penetration of water into the inner layers of the brake hose.

DESCRIPTION OF THE PREFERRED EMBODIMENTS

(1) Schematic Structure of Brake Hose 10

Figure 1:
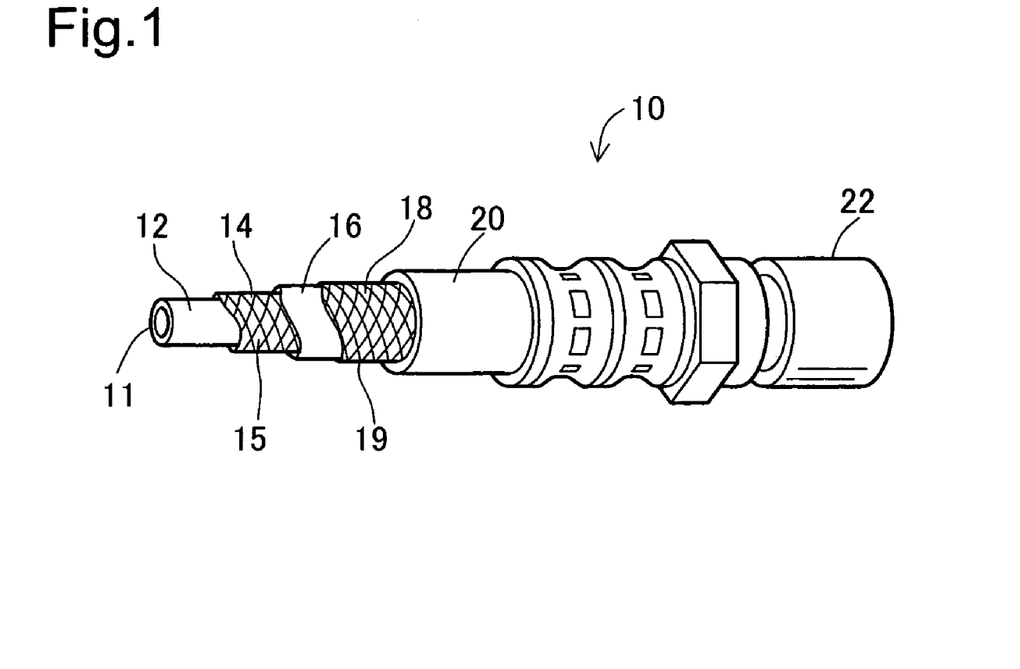
FIG. 1 is an oblique partial cutaway view of the brake hose in an embodiment of the invention.
Figure 2:
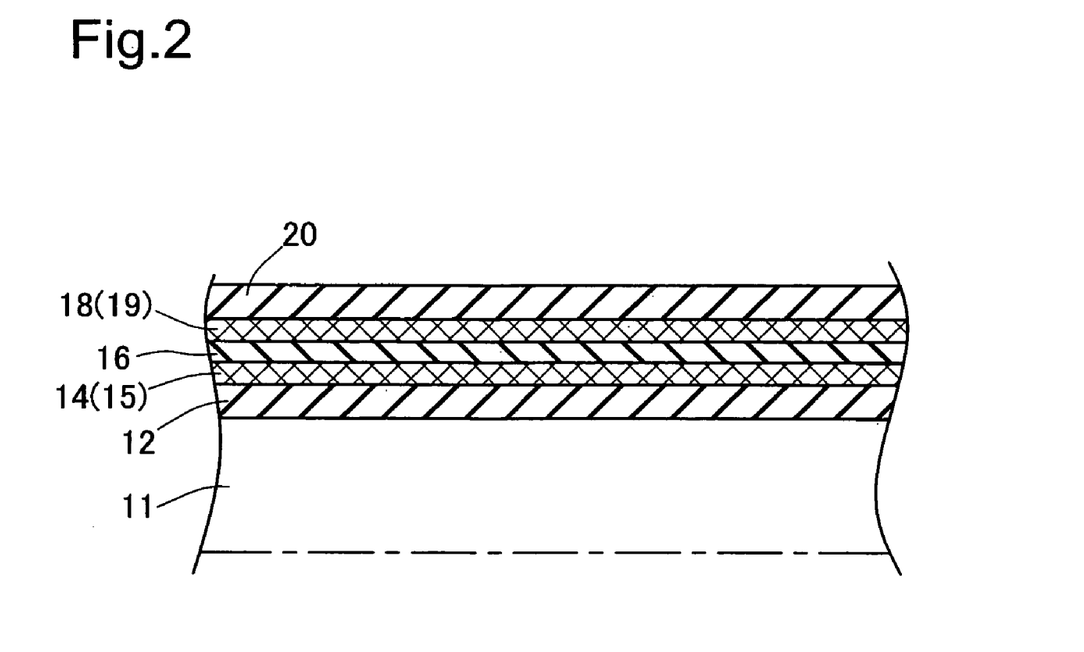
FIG. 2 is a half cross section of the brake hose.

FIG. 1 is an oblique partial cutaway view of the brake hose 10 in an embodiment of the invention, and FIG. 2 is a half-cross section of the brake hose 10. The brake hose 10 in FIGS. 1 and 2 is used to connect a hydraulic system on the tire side with the master cylinder used in automobile hydraulic brakes (not shown), and is laminated in five layers to withstand the brake fluid pressure. That is, the brake hose 10 has an inner tube rubber layer 12 with a flow path 11, a lower yarn layer 14, an intermediate rubber layer 16, an upper yarn layer 18, and a cover rubber layer 20. The brake hose 10 is joined at the end by tightening a cap 22.

(2) Structure of Layers in Brake Hose 10

The materials, thickness, and the like of the layers of the brake hose 10 have been established in order to provide properties such as pressure resistance, durability, expansion resistance, and water penetration resistance to allow the hose to withstand brake fluid pressure up to 50 MPa.

(2)-1 Inner Tube Rubber Layer 12

The inner tube rubber layer 12 is formed of a blend of EPDM and IIR primarily to provide brake fluid resistance. The composition of the blend consists of 40 to 80% IIR and 20 to 60% EPDM remainder. Less than 40% IIR will not provide satisfactory water penetration resistance, whereas more than 80% IIR tends to result in lower brake fluid resistance and in permanent set-in fatigue, particularly in environments of 70° C. or higher. 50 to 80% IIR is even more desirable. The inner tube rubber layer 12 has an inside diameter of 3.0 to 3.4 mm, and is 0.5 to 1.0 mm thick.

(2)-2 Lower Yarn Layer 14

The lower yarn layer 14 comprises a wound yarn comprising two or three strands of a fiber of PET fiber lines, and is formed by braiding the yarn around the inner tube rubber layer 12 using a braid count of 20 count or 24 count. The braid count of 20 count or 24 count means that the yarn is drawn from bobbins located at 20 or 24 locations and braided around the inner tube rubber layer 12, as described below. For the sake of low expansion and good durability, the lower yarns of the lower yarn layer should be thread with a tensile strength per unit decitex of at least 6.5 g, and elongation of 2.6±1% at 2.7 g.

(2)-3 Intermediate Rubber Layer 16

The intermediate rubber layer 16 is a layer for preventing the lower yarn layer 14 and upper yarn layer 18 from becoming displaced, and is formed by wrapping a sheet of a rubber material onto the lower yarn 15. The sheet of rubber material is the same material and composition as the inner tube rubber layer 12, that is, a blend of IIR and EPDM. The intermediate rubber layer 16 should be 0.1 to 0.25 mm thick. That is, if the intermediate rubber layer 16 is less than 0.1 mm, it will be too thin, and will not be able to be braided around the lower yarn layer 14, whereas if it is thicker than 0.25 mm, the resulting thick intermediate rubber layer will act as an elastic layer permitting the lower yarn layer 14 to become displaced, and thus will have less action in preventing the lower yarn layer from becoming displaced.

(2)-4 Upper Yarn Layer 18

Figure 3:
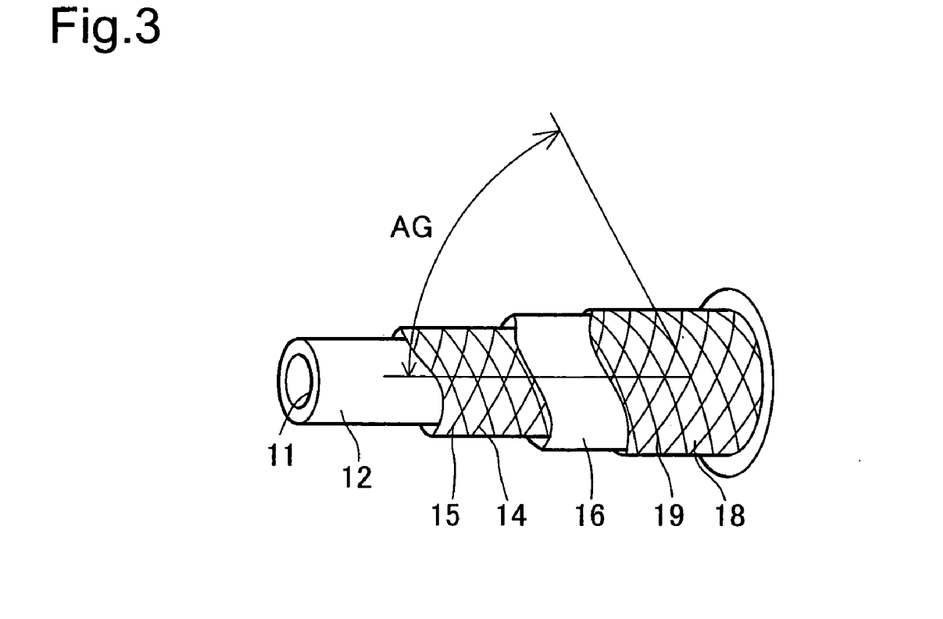
FIG. 3 shows braiding angle of upper yarn layer.

The upper yarn layer 18 comprises a wound yarn comprising two or three stands of a fiber of PVA, which are is formed by braiding the yarn around the intermediate rubber layer 16 using a braid count of 20 count or 24 count. PVA has higher water retention and hygroscopicity than the PET used for the lower yarn, and can slow down the penetration of water into the inner layers of the brake hose 10. Also, as illustrated in FIG. 3, the braiding angle AG is set at 57 to 61 degrees. This is because setting the braiding angle AG of the upper yarn layer 18 higher than the conventional braiding angle AG of about 55 degrees can increase the amount of upper yarn per unit length, increase water retention, and slow down the penetration of water into the inner layers of the brake hose 10. The braiding angle AG should be at least 57 degrees in order to achieve the above effects, but should be no greater than 61 degrees because the brake hose will tend to expand axially under pressure and the brake hose behavior under pressure will become unstable.

The upper yarn consisting of PVA has a tensile strength per unit decitex of at least 6.5 g, and an elongation of 1.2±1% at 1.9 g.

(2)-5 Cover Rubber Layer 20

The cover rubber layer 20 is made of EPDM, a blend of EPDM and CR(Chloroprene Rubber), or the like, primarily in order to provide ozone resistance. The thickness is 0.5 to 1.0 mm.

(3) Method for Producing Brake Hose 10

A method for manufacturing the brake hose 10 is described below. The brake hose 10 can be produced by a well know method, such as by implementing a rubber extrusion process, a fiber yarn braiding process, and vulcanization process.

(3)-1 Hose Manufacturing Apparatus 30

Figure 4:
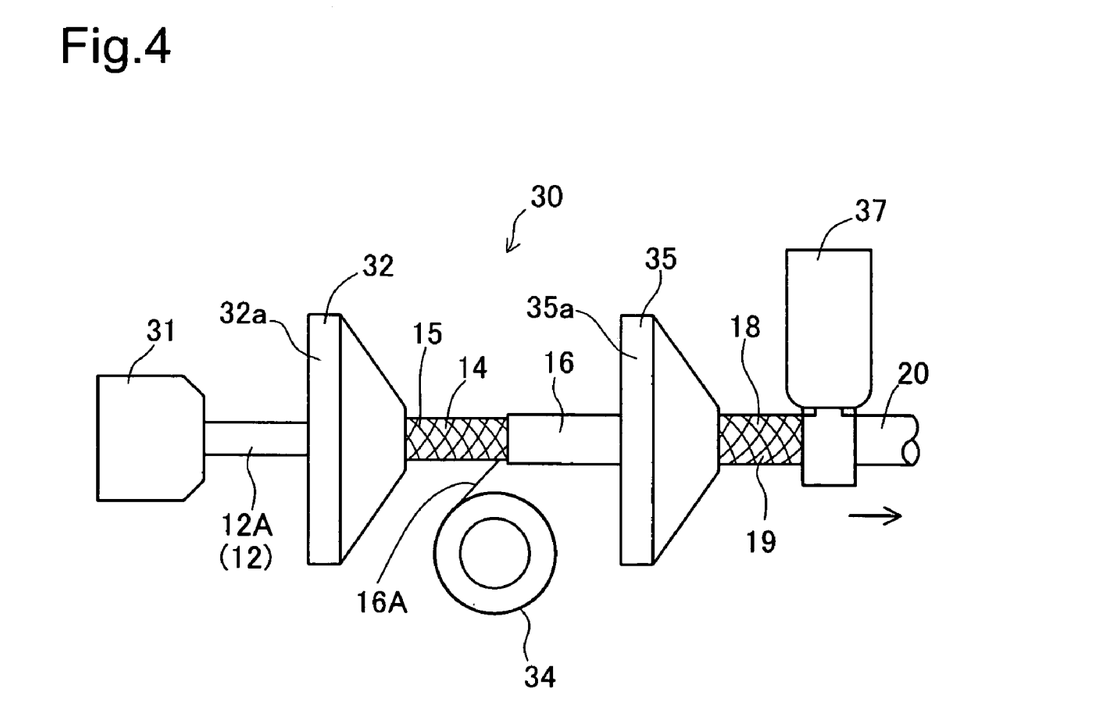
FIG. 4 shows hose manufacturing apparatus.

FIG. 4 illustrates a hose manufacturing apparatus 30. In FIG. 4, the hose manufacturing apparatus 30 comprises a first extrusion unit 31, first braiding device 32, intermediate sheet forming device 34, second braiding device, and second extruding unit 37. The first extrusion unit 31 extrudes a rubber material 12A to form the inner tube rubber layer 12. The first braiding device 32 has a bobbin carrier mounted on a drum 32a, and forms the lower yarn layer 14 by braiding the lower yarn 15 onto the extruded inner tube 12A as the lower yarn 15 is fed from the bobbin carrier. The intermediate sheet forming device 34 feeds out the sheet material 16A for forming the intermediate rubber layer 16 from a roller onto the lower yarn layer 14 which has been braided by the first braiding device 32. The second braiding device 35, which is virtually the same structure as the first braiding device 32, has a bobbin carrier mounted on a drum 35a, and forms the upper yarn layer 18 by braiding the upper yarn 19 onto the intermediate rubber layer 16 as the upper yarn 19 is fed from the bobbin carrier. The second extruding unit 37 extrudes a rubber material to form the cover rubber layer 20.

(3)-2 Manufacturing Steps of Brake Hose 10

A series of steps for producing the brake hose 10 by means of the hose manufacturing apparatus 30 is described below with reference to FIG. 4. The rubber material 12A is first extruded from the first extrusion unit 31 to form the inner tube rubber layer 12. At that time, a mandrel (not shown) is inserted into the inner tube rubber layer 12. The lower yarn layer 14 is then formed on the extruded inner tube rubber layer 12 by feeding out the lower yarn 15 from the bobbin carrier as the drum 32a of the first braiding device 32 is rotated to braid the lower yarn 15 onto the inner tube rubber layer 12. In this case, the lower yarn 15 is fed out from a total of 20 bobbins rotating in the opposite direction to allow the lower yarn layer 14 to be braided with a braid count of 20. The sheet material 16A is then fed from the intermediate sheet forming device 34 onto the lower yarn layer 14 to form the intermediate rubber layer 16. The upper yarn 19 is then fed onto the intermediate rubber layer 16 from bobbins as the drum 35a of the second braiding device 35 is rotated to braid the upper yarn layer 18 onto the intermediate rubber layer 16. A rubber material is then extruded from the second extruding unit 37 onto the upper yarn layer 18 to form the cover rubber layer 20.

A vulcanization step is then carried out. The vulcanization conditions are set for 15 to 60 minutes at 120 to 170° C. The heat of the vulcanization process allows the upper yarn layer 18 and lower yarn layer 14 to be bonded to the inner tube rubber layer 12, intermediate rubber layer 16, and cover rubber layer 20. The brake hose 10 is thus integrally formed.

(4) Brake Hose Action/Effects

The water penetration resistance of the brake hose was tested in the following manner. Water penetration resistance was determined by the Moisture Transmission Test (SAE J1873). That is, a 305 mm long brake hose with caps at both ends was set up and pre-dried for 24 hours at 100° C., it was allowed to cool, the brake hose was then filled with brake fluid, and the caps at both ends were sealed, giving a test sample. Samples were then immersed for 72 hours in 70° C. distilled water. The brake fluid was then removed from the samples that had been immersed, and the moisture which had dissolved in the brake fluid was determined by the Karl Fischer method. The following Samples 1 through 8 having different brake hose layer materials and the like were prepared, and the samples were tested for water penetration. The results are given in FIGS. 5 through 8.

Figure 5:
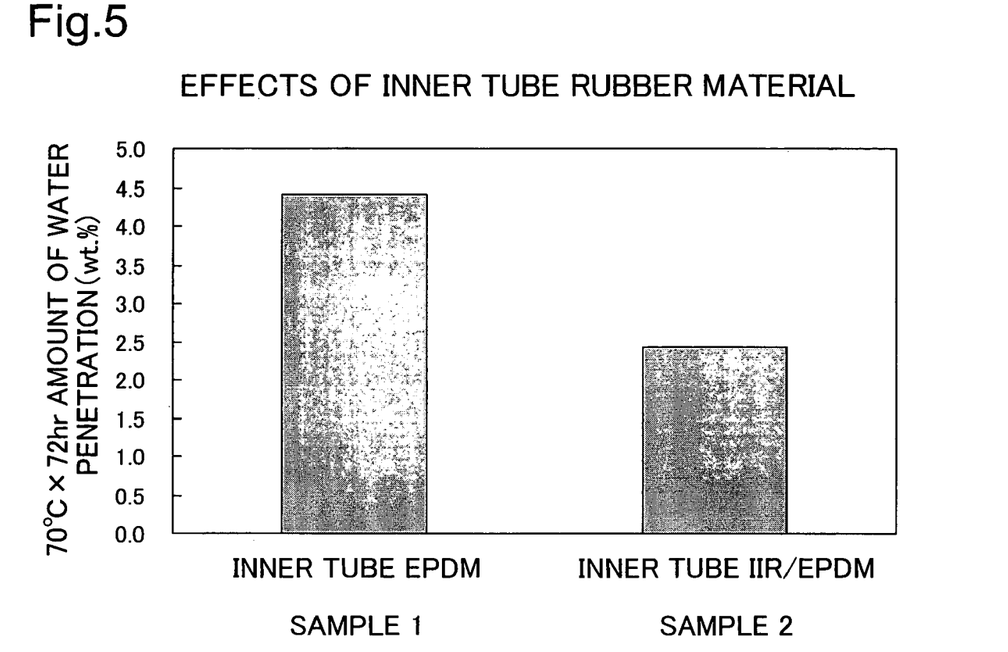
FIG. 5 is a graph of the amounts of penetrating water according to changes in the rubber materials of the inner tube rubber layer.

FIG. 5 is a graph of the amounts of penetrating water according to changes in the rubber materials of the inner tube rubber layer. The inner tube rubber layer was EPDM in Sample 1, and an IIR/EPDM blend (IIR 75%, EPDM 25%) in Sample 2. The other samples were the same as Samples 1 and 2, with PET as the lower yarn layer, EPDM as the intermediate rubber layer, PET as the upper yarn layer, and EPDM as the cover rubber layer. In FIG. 5, Sample 2 having the IIR blended with EPDM resulted in lower water penetration than Sample 1 which involved the use of EPDM alone.

Figure 6:
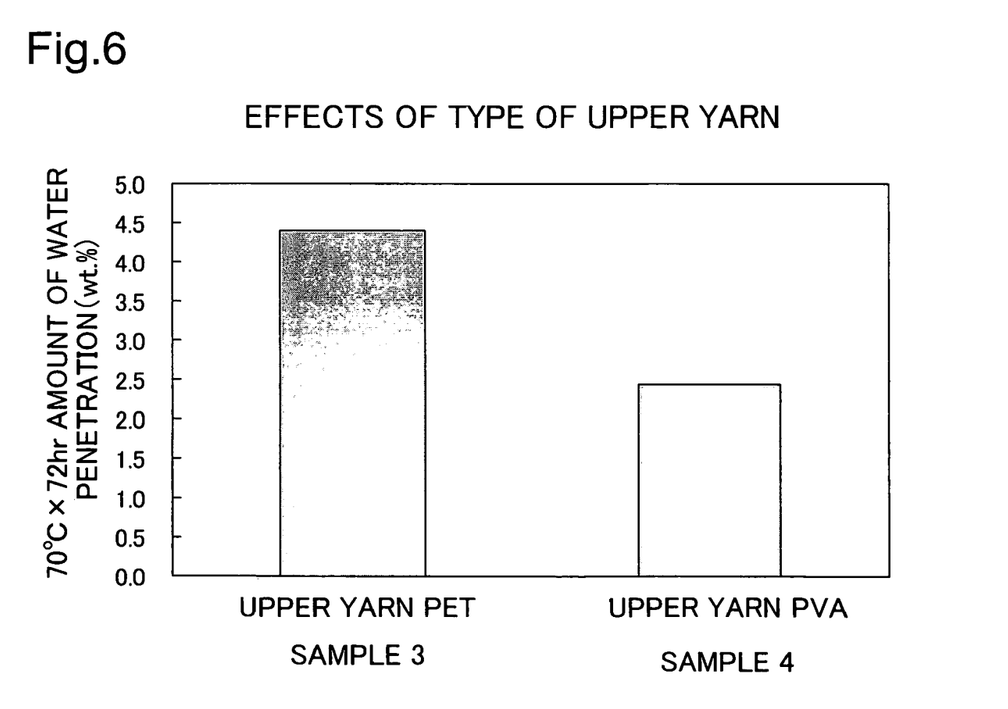
FIG. 6 is a graph of the amounts of penetrating water according to changes in the type of upper yarn in the upper yarn layer.

FIG. 6 is a graph of the amounts of penetrating water according to changes in the type of upper yarn in the upper yarn layer. The upper yarn was PET in Sample 3, and was PVA in Sample 4. The other samples were the same as Samples 3 and 4, with EPDM as the inner tube rubber layer, PET as the lower yarn layer, EPDM as the intermediate rubber layer, and EPDM as the cover rubber layer. In FIG. 6, Sample 4 with the PVA upper yarn resulted in lower water penetration than Sample 3 with the PET upper yarn.

Figure 7:
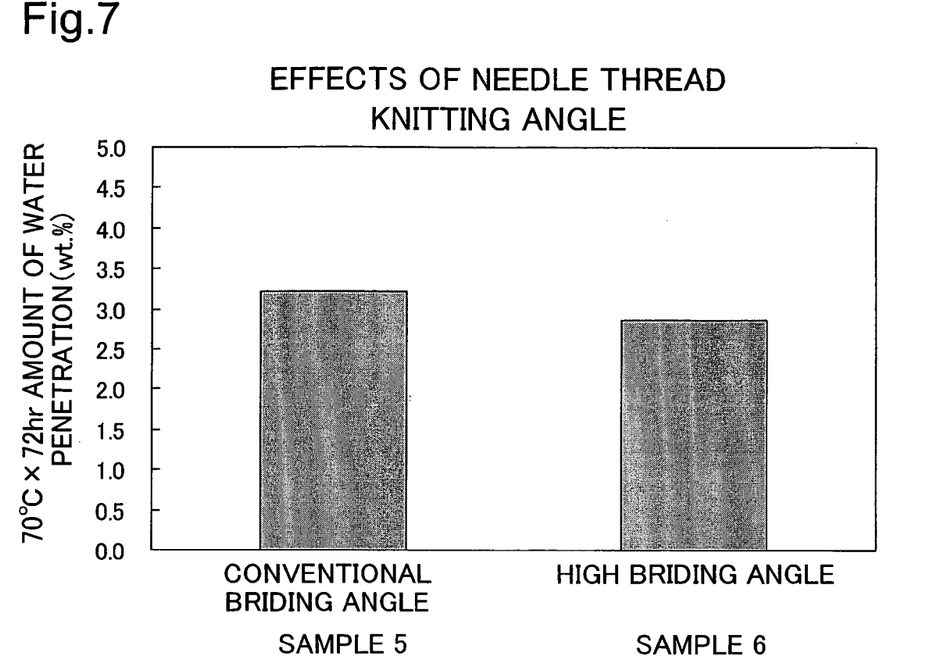
FIG. 7 is a graph of the amounts of penetrating water according to changes in the braiding angle of the upper yarn.

FIG. 7 is a graph of the amounts of penetrating water according to changes in the braiding angle AG of the upper yarn. The upper yarn braiding angle AG was 55 degrees in Sample 5 and 59 degrees in Sample 6. The other samples were the same as Samples 5 and 6, with EPDM as the inner tube rubber layer, PET as the lower yarn layer, NR as the intermediate rubber layer, PVA as the upper yarn layer, and EPDM as the cover rubber layer. In FIG. 7, Sample 6 with the greater upper yarn braiding angle AG of 59 degrees resulted in lower water penetration than Sample 5 with the braiding angle AG of 55 degrees.

Figure 8:
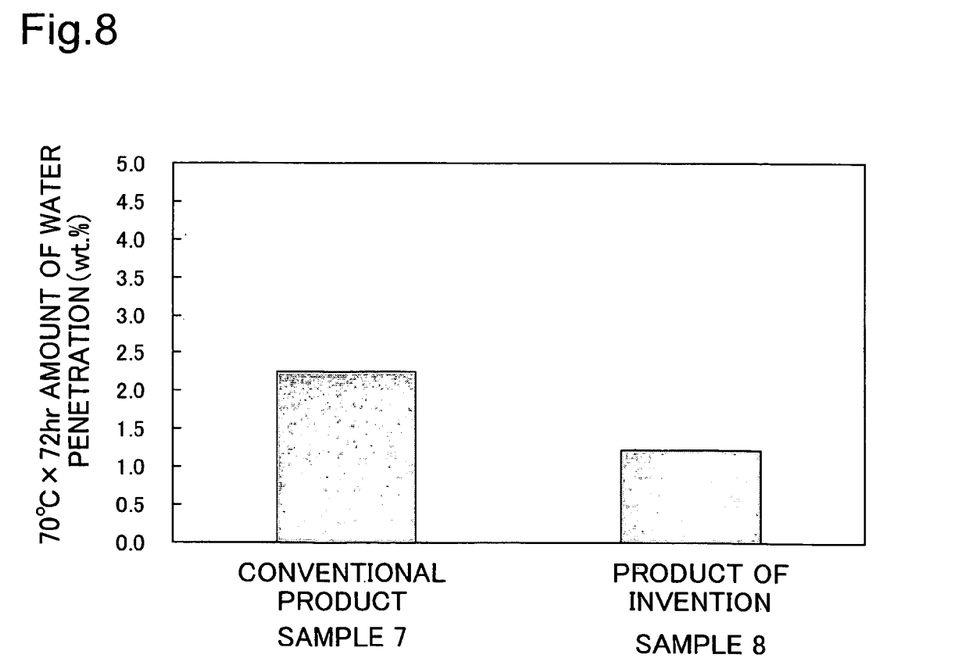
FIG. 8 is a graph of water penetration in an embodiment of the invention and a conventional example.

FIG. 8 is a graph of water penetration in an embodiment of the invention and a conventional example. Sample 7 is the conventional example, with EPDM as the inner tube rubber layer, PET as the lower yarn layer, EPDM as the intermediate rubber layer, PVA as the upper yarn layer with a braiding angle AG of 55 degrees, and EPDM as the cover rubber layer. Sample 8 is an embodiment of the invention, having the inner tube rubber layer, upper yarn material, and upper yarn braiding angle AG, described in Samples 2, 4, and 6 of FIGS. 5 through 7, and an intermediate rubber layer of IIR/EPDM in a ratio of 75/25. In FIG. 8, Sample 8, which is an embodiment of the invention, resulted in less water penetration than Sample 7 (conventional example).

Figure 9:
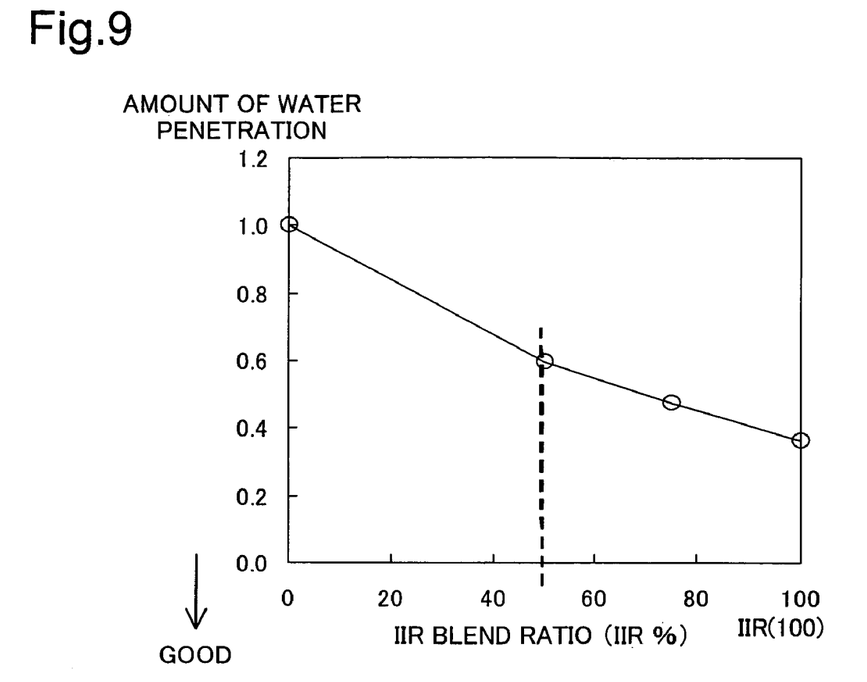
FIG. 9 is a graph of the relationship between water penetration and the blend ratios of IIR and EPDM.
Figure 10:
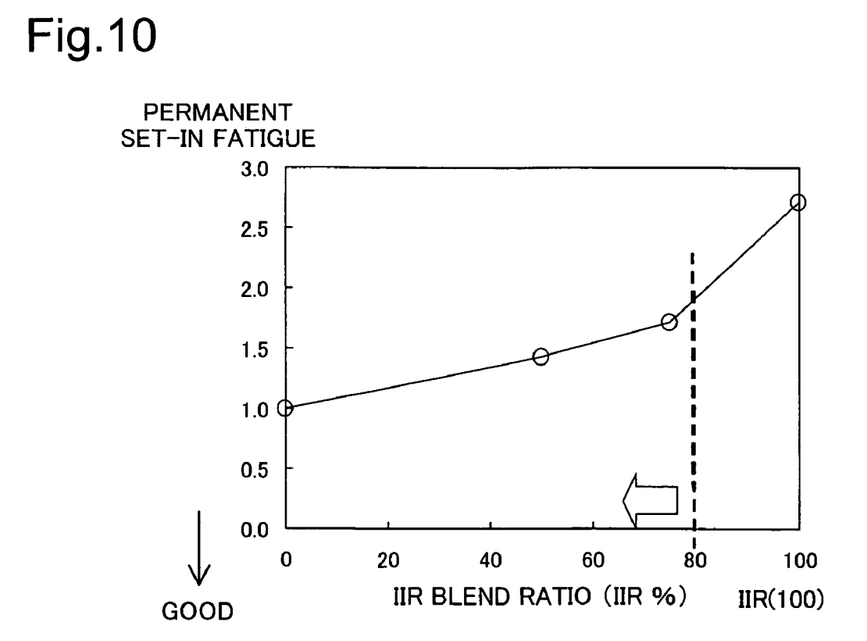
FIG. 10 is a graph of the relationship between permanent set-in fatigue and the blend ratios of IIR and EPDM.

The graphs in FIGS. 9 and 10 elucidate the composition of the blended materials used for the inner tube rubber layer 12 and intermediate rubber layer 16. FIG. 9 graphs the relationship between water penetration and the blend ratios of IIR and EPDM, and FIG. 10 graphs the relationship between permanent set-in fatigue and the blend ratios of IIR and EPDM. FIGS. 9 and 10 show that the IIR and EPDM blend ratio should be set to between 40 and 80% in consideration of the above parameters. The value of 1 for the water penetration and permanent set-in fatigue in FIGS. 9 and 10 indicates the use of EPDM alone. The values otherwise varied depending on the blend ratio with IIR.

The brake hose of the embodiment was also tested for other properties, namely, durability and volume expansion. The properties were the same as in conventional hose, regardless of the changes in the materials for the inner tube rubber layer 12 and intermediate rubber layer 16, or the changes in the braiding angle of the upper yarn layer 18.

The invention is not limited to the embodiment above, and can be implemented in a variety of embodiments without departing from the spirit thereof. The following variants are possible, for example. In the embodiment above, rubber with the same blend ratio was used for the inner tube rubber layer and intermediate rubber layer, but materials with different blend ratios can be used in order to achieve a balance between water penetration and permanent set-in fatigue.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A brake hose including reinforcing layers in a rubber base,
   the brake hose comprising:
   an inner tube rubber layer that is made of a first rubber material and has a flow path for flowing fluid;
   a lower yarn layer formed by braiding first yarns made of a first yarn material around the inner tube rubber layer;
   an intermediate rubber layer that is made of a second rubber material and covers the lower yarn layer;
   an upper yarn layer formed by braiding second yarns made of a second yarn material around the intermediate rubber layer and;
   a cover rubber layer that is made of a third rubber material and covers the upper yarn layer,
   wherein each of the first and second rubber material is a blend in which 40 to 80 wt % is an isobutylene-isoprene copolymer (IIR) and, 20 to 60% is an ethylene-propylene-diene copolymer (EPDM),
   the first yarn material is polyethylene terephthalate (PET), with a tensile strength per unit decitex of at least 6.5 g, and 2.7 g elongation of 2.6±1%, and
   the second yarn material is polyvinyl alcohol (PVA).

2. The brake hose in accordance with claim 1, wherein the upper yarn layer is braided by intertwining two groups of the first yarns at a braiding angle 57 to 61 degrees, the braiding angle being an angle at which the two groups of the upper yarn being interwoven.

3. The brake hose in accordance with claim 2, wherein the blend comprises 50 to 80 wt % of IIR and, 20 to 50% of EPDM.

4. The brake hose in accordance with claim 1, wherein the blend comprises 50 to 80 wt % of IIR and, 20 to 50% of EPDM.

5. The brake hose in accordance with claim 1, wherein the third rubber material is made of a rubber material selected from a group consisting of EPDM and a blend of EPDM and CR(Chloroprene Rubber).

6. The brake hose in accordance with claim 1, wherein the inner tube rubber layer has a thickness of 0.5 to 1.0 mm.

7. The brake hose in accordance with claim 6, wherein the intermediate rubber layer has a thickness of 0.1 to 0.25 mm.

8. The brake hose in accordance with claim 1, wherein the second yarn material of PVA has a tensile strength per unit decitex of at least 6.5 g, and an elongation of 1.2±1% at 1.9 g.

* * * * *